Dec. 31, 1940.    R. F. ENSIGN ET AL    2,226,810
SYSTEM FOR CONTROLLING VAPOR PRESSURE IN FUEL SUPPLY TANKS
Filed Nov. 18, 1938
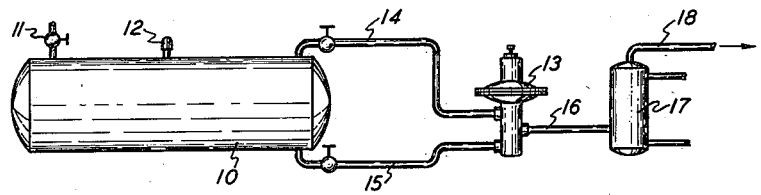
FIG. 1
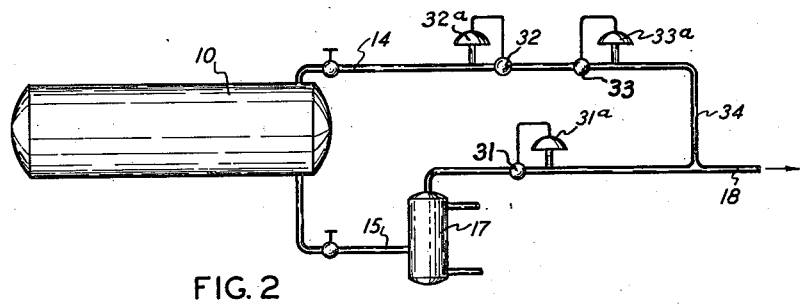
FIG. 2
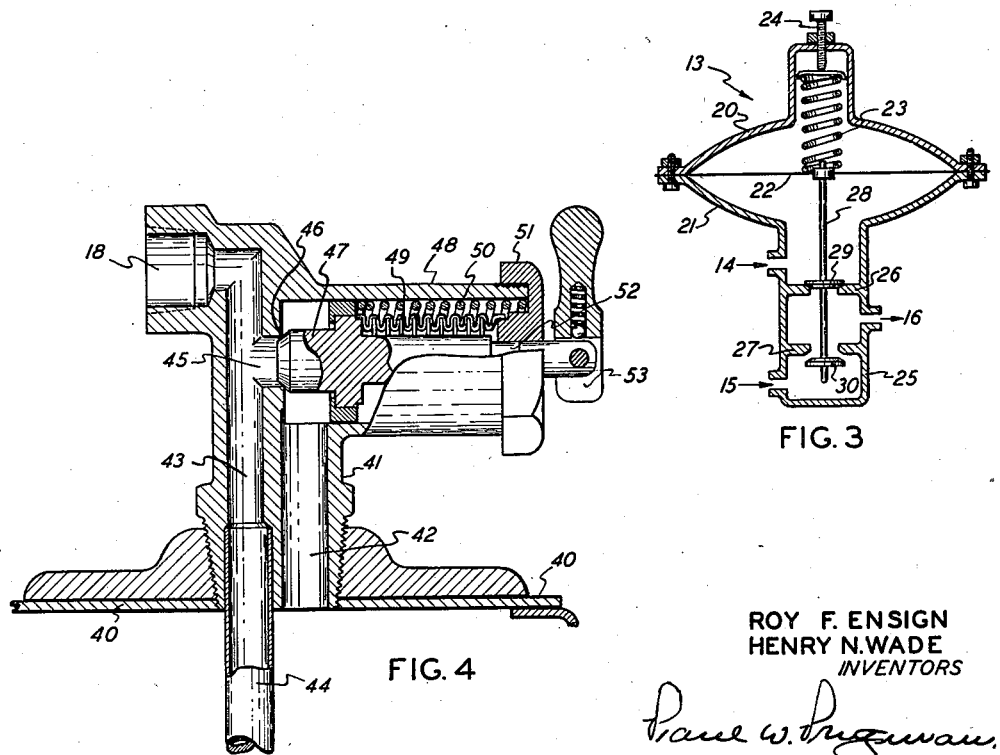
FIG. 3
FIG. 4
ROY F. ENSIGN
HENRY N. WADE
INVENTORS
ATTORNEY

UNITED STATES PATENT OFFICE 2,226,810

SYSTEM FOR CONTROLLING VAPOR PRESSURE IN FUEL SUPPLY TANKS

Roy F. Ensign, San Marino, and Henry N. Wade, Los Angeles, Calif., assignors to Parkhill-Wade, Los Angeles, Calif., a corporation of California Application November 18, 1938, Serial No. 241,172

3 Claims. (Cl. 62—1)

The invention pertains to the art of supplying highly volatile fuels, such as a mixture of propane and butane, to internal combustion engines mounted in motor vehicles.

The object of the invention is to maintain the contents of the fuel tank at a substantially constant pressure, at least so long as the composition of the contents remains unchanged.

Systems of truck and bus propulsion using propane and butane as fuel cannot use float feed carburetors, as these fuels boil below ordinary atmospheric temperature, but are provided with means for vaporizing the stream of fuel passing toward the engine and for metering it in vapor form. These devices have no part in the present system and need not be described, but it is essential to the understanding of the invention to bear in mind that the stream of fuel may pass to the vaporizing device either as a liquid stream or as a stream of vapor already formed, and that the two states may alternate without requiring any adjustment of the vaporizing and metering devices to compensate for the change of state.

Propane and butane, as is well known, develop very high vapor pressures when heated to superatmospheric temperatures. The fuel tanks of heavy vehicles are usually mounted on the under side of the vehicle body when they are exposed to heat radiated from the road surface and are often surrounded by hot air from the engine. Under such circumstances, during hot weather, fuel tank temperatures as high as 120° to 130° Fahr. have been observed. These high temperatures produce correspondingly high vapor pressures in the fuel tank, causing waste of fuel through the operation of the safety relief valve, interfere with the accurate metering of the fuel supply to the engine, and make refilling of the tank difficult by reason of the high pressure to be overcome by the charging pump.

We obviate all of these difficulties by the general method of withdrawing the engine feed stream from the fuel tank in the liquid form so long as the pressure in the tank does not exceed a predetermined value, and withdrawing vapor from above the liquid level in the tank whenever this value is exceeded. This object is most readily accomplished through the agency of the automatic fuel selective valve mechanisms which will later be described.

The theory of the method is as follows:

Assume for illustration that the fuel tank is filled with pure propane, and that the temperature of the tank and its contents is 110° F. The vapor pressure data for propane shows that the pressure in the tank under these circumstances will be 214 pounds per square inch absolute. Assuming that the fuel selective device is set to permit withdrawal of vapor only from the tank for all pressures above 100 pounds per square inch absolute, the fuel withdrawn from the tank will be taken from the vapor space only until the pressure has declined to this set pressure. The first withdrawal of vapor will naturally reduce the pressure in the vapor space, since the vapor and liquid are assumed to be in equilibrium with each other at the given temperature. This reduction of pressure will cause the liquid in the tank to boil, tending to maintain the pressure in the tank constant; however, the act of boiling the liquid requires the surrender of heat by the liquid equivalent to the latent heat of vaporization of the liquid boiled away; under the initial conditions specified, this latent heat for propane amounts to about 140 B. t. u. per pound of liquid vaporized. The removal of this heat from the liquid naturally lowers the temperature of the remaining liquid, and consequently reduces the vapor pressure within the tank. This process of cooling by vaporization continues till the pressure has been reduced to the set point of the fuel selective device; the vapor pressure curve for propane indicates that the set pressure of 100 pounds will be reached at a temperature of about 56° F. At this point the fuel selective device will close off the outlet from the vapor space in the tank, simultaneously opening the normal liquid fuel outlet.

If the heat input to the tank through radiation or contact with hot air continues, the fuel selector will take up a floating position, such that just enough vapor is withdrawn along with the liquid fuel to maintain the tank pressure at the point for which the selector is set.

The fuel selective mechanism may take various forms, of which two are illustrated in the accompanying drawing. In this drawing:

Fig. 1 illustrates in a diagrammatic manner an assembly of apparatus in which the selection between liquid and vapor in response to pressure changes within the tank is performed by a single valve;

Fig. 2 illustrates a form of the invention in which the selection is effected by two cooperating valves;

Fig. 3 is a detail of one form of the selecting valve 13 of Fig. 1, and

Fig. 4 is a detail of an alternative form of selecting valve.

Referring first to Fig. 1, 10 is a closed fuel supply tank adapted to retain volatile liquids under pressure. This tank is provided conventionally with a filling connection 11 and a pressure relief valve 12. The latter is a safety valve only and one of the objects of the invention is to prevent its being brought into operation.

A selecting valve 13 is connected with the top and the bottom of tank 10 by pipes 14 and 15. As these connections are located, pipe 14 can withdraw only vapor and pipe 15 can withdraw only liquid from the tank. The fluid discharged by this valve passes through a pipe 16 to any vaporizer 17 in which it is heated to the vaporizing temperature by means of hot water, steam, or other heated fluid, and is then passed to the engine or other point of utilization through pipe 18.

Referring now to Fig. 3, valve 13 may consist of a housing in two sections 20 and 21 bolted together and parted by a flexible diaphragm 22. The upper section encloses a spring 23 bearing on the upper surface of the diaphragm, the pressure exerted by this spring being adjustable by means of screw 24.

The lower section is projected downwardly to form a pot 25 within which are formed annular valve seats 26 and 27, facing in opposite directions. To the diaphragm is attached a valve stem 28 carrying two valve discs 29 and 30, so spaced that when one of the discs is on its seat the other is spaced from its seat. Pipe 14 is connected into the pot above valve seat 26; pipe 15 is connected below valve seat 27; and pipe 16 is connected between the two valve seats.

The space above valve seat 26 and below diaphragm 22 being at all times in communication with the vapor spaces in tank 10 through pipe 14, the operation of the assembly shown in Figs. 1 and 3 is as follows. We will assume, as an illustration, that the upward force exerted by the vapor just balances the downward thrust of the spring when the vapor pressure in the tank is 70 pounds per square inch. In this position the upper valve 26 is just closed and the lower valve 27 is wide open. Liquid only now flows from the tank through pipe 15, valve 27, and pipe 16 to the vaporizer 17 or other apparatus for utilization of the fuel.

Now assume that the pressure on the fuel tank, due to increase in atmospheric temperature or other possible causes, increases to say 80 pounds per square inch. The area of diaphragm 22 and the force constant of the spring 23 are so selected that the stem 28 moves upwardly, closing lower valve 27 against its seat and simultaneously opening upper valve 26. It is obvious that under these changed conditions the fuel requirements are withdrawn entirely from the vapor space in the fuel tank, the liquid connection being completely shut off. This flow of vapor continues until the temperature of the fuel tank has been reduced sufficiently to lower the pressure to the point which restores the valves to their initial or normal position.

It is obvious that in the event external heat is applied continuously to the fuel tank, the system will arrive at a floating position, in which upper valve 26 is just enough opened to allow such quantity of vapor to pass as will keep the tank in thermal equilibrium.

Fig. 2 shows another form of the invention, applicable to prevalent types of stationary installations. The fuel tank 10 is shown as before, with vapor line 14 and liquid line 15 leading from it. Liquid line 15 passes first to a vaporizer 17, heated by hot water, steam, or some other method, and capable of vaporizing the liquid under the fuel tank pressure. Valves 31, 32, and 33 are automatically actuated by pressure responsive devices indicated at 31a, 32a, and 33a, respectively. Pressure reducing valve 31 is provided to reduce the pressure from that in the fuel tank to the normal distribution system pressure, say 5 pounds per square inch. Valve 31 would ordinarily be a normally open diaphragm valve of conventional type, which is closed by increasing pressure on the diaphragm.

The pressure in the fuel tank is prevented from rising above a predetermined point by the cooperative action of valves 32 and 33 in vapor line 14, and valve 31 in the liquid line 15. Valve 32 is a normally closed diaphragm valve of conventional type, which is opened by increasing pressure on the diaphragm. Valve 33 is a normally open diaphragm valve which is closed by increasing pressure on the diaphragm. For the sake of illustration, valve 32 is set to open at, say 70 pounds per square inch gauge, and valve 33 is set to close at, say 7 pounds per square inch. Under normal operation, with less than 70 pounds pressure in the fuel tank, the pressure on the fuel delivery line 18 is maintained constant at 5 pounds by the operation of valve 31. Since this pressure is less than the 7 pounds set pressure of valve 33, this valve normally stands open. However, under these conditions, no flow occurs in line 14, since the pressure in the fuel tank is lower than the 70 pounds pressure at which valve 32 is set to open.

Now assume that the pressure in the fuel tank is increased to, say 75 pounds per square inch, valve 32 immediately opens, and, since valve 33 is already open, vapor passes through pipe 34 into the delivery line 18. Assuming that the demand on the delivery line remains approximately constant, this delivery of additional vapor through valve 33 builds up the pressure in the delivery line to 7 pounds per square inch, the pressure at which valve 33 is set to close. Since this pressure of 7 pounds is higher than the 5 pounds set pressure of valve 31, this valve closes, shutting off the utilization of fuel from the liquid side of the fuel tank and causing all of the fuel demand to flow from the vapor space in the fuel tank. Such flow continues until the pressure in the fuel tank is reduced to the 70 pounds set pressure of valve 32, when this valve closes and normal fuel supply conditions are resumed through the liquid line vaporizer and valve 31.

The valve shown in Fig. 4 is a simpler device than the valve of Fig. 3, accomplishing its effect of selection by the aid of gravity and thus requiring only one seat and disc. It is useful when there is sufficient head room to permit it to be inserted directly into the top of tank 10, the only position in which it is functional.

Referring to Fig. 4, 40—40 is a fragment of the upper side of tank 10; 41 is a body having two vertical passages 42 and 43. Passage 42 terminates just inside the shell of the tank and thus communicates only with the vapor space within the tank, while passage 43 is continued to a point near the bottom of the tank by a drop pipe 44 and thus communicates only with the liquid space. Passage 43 continues without obstruction into the outlet 18 through which the fuel flows to the point of utilization. Passage 42 terminates within the valve body but communicating with the upper part of passage 43 (and therefore with outlet 18) through a port 45. In this port is formed a valve seat 46 to which is fitted a valve disc 47, this disc being in the form of a piston sliding in a lateral extension 48 of the valve body. Bearing against the rearward face of this piston is a "Sylphon" bellows 49 and an open coil spring 50, both held in position by a screw cap 51.

So long as the vapor pressure in passage 42 is insufficient to lift disc 47 from its seat, the vapor pressure within the tank causes liquid to flow through pipe 44 and passage 43 to the point of utilization. When the pressure in passage 42 exceeds the pressure for which spring 50 is set, the bellows collapses, disc 47 is lifted from seat 46, and vapor flows through port 45 into passage 43 and outlet 18. So long as this valve remains open, the hydrostatic head in pipe 44 prevents the flow of liquid into passage 43. If desired, an extension 52 from disc 47 may be continued through cap 51 and provided with a lifting lever 53 for opening valve 47 manually. This is convenient for starting cold engines.

While the invention has been described with sole reference to the supporting of fuel to automotive engines, it will be understood that it is equally applicable to stationary engines, to industrial application utilizing volatile liquids as a source of clean gas fires, and to heating and cooking installations, in fact to any tank of volatile fuel exposed to variable temperatures.

We claim as our invention:

1. Apparatus for protecting tanks of volatile fuel against excessive pressure, comprising: channels communicating with respectively the vapor space and the liquid space within said tank; a valve body communicating with both said channels; a movable element acted on by the pressure in said vapor channel; resilient means restraining the movement of said element; individual valves arranged across said channels; means actuated by movement of said movable element to open only the vapor valve when the vapor pressure exceeds a predetermined maximum and to open only the liquid valve when the vapor pressure falls below said maximum, and a common outlet channel to receive the fluid passing through either of said valves.

2. Apparatus for protecting tanks of volatile fuel against excessive pressure, comprising: channels communicating with respectively the vapor space and the liquid space within said tank; a body located above said tank, containing portions of said two channels, provided with an outlet connection communicating with said liquid channel, and provided with a port connecting said channels with one another; and a movable valve member adapted to maintain said port closed while the vapor pressure within said tank is below a predetermined limit and to open said port and admit vapor at substantially full tank pressure to said liquid channel when said vapor pressure rises to above said predetermined limit.

3. Apparatus for protecting tanks of volatile fuel against excessive pressure, comprising: channels communicating with respectively the vapor space and the liquid space within said tank; a valve body communicating with both said channels and with an outlet channel; a movable element acted on by the pressure in said vapor channel; resilient means restraining the movement of said element; and a valve member, actuated by said movable element, arranged to maintain said vapor channel closed while said vapor pressure is below a limit predetermined by the strength of said resilient means and to open said vapor channel and prevent flow of liquid in said liquid channel when said vapor pressure is above said predetermined limit.

ROY F. ENSIGN.
HENRY N. WADE.